(12) United States Patent
Liu (10) Patent No.: US 11,127,303 B2
(45) Date of Patent: Sep. 21, 2021

(54) VEHICLE SCHEDULING METHOD AND APPARATUS, DEVICE AND STORAGE MEDIUM

(71) Applicant: BEIJING BAIDU NETCOM SCIENCE AND TECHNOLOGY CO., LTD., Beijing (CN)

(72) Inventor: Tao Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 108 days.

(21) Appl. No.: 16/116,536

(22) Filed: Aug. 29, 2018

(65) Prior Publication Data

US 2019/0088141 A1  Mar. 21, 2019

(30) Foreign Application Priority Data

Sep. 15, 2017 (CN) .......................... 201710831219.X (51) Int. Cl.
*G08G 1/00* (2006.01)
*G06Q 10/02* (2012.01)
(Continued)

(52) U.S. Cl.
CPC .......... *G08G 1/202* (2013.01); *G01C 21/3438* (2013.01); *G01C 21/3679* (2013.01);
(Continued)

(58) Field of Classification Search
CPC ............... G08G 1/202; G01C 21/3438; G01C 21/3679; G01C 21/3682; G05D 1/0088;
(Continued)

(56) References Cited

U.S. PATENT DOCUMENTS

2015/0339928 A1    11/2015  Ramanujam
2016/0209220 A1*   7/2016   Laetz ..................... G08G 1/202
(Continued)

FOREIGN PATENT DOCUMENTS

CN    102340738 A    2/2012
CN    103927789 A    7/2014
(Continued)

*Primary Examiner* — Navid Ziaeianmehdizadeh
*Assistant Examiner* — Sean P Quinn
(74) *Attorney, Agent, or Firm* — Seed IP Law Group LLP (57) ABSTRACT

The present disclosure provides a vehicle scheduling method and apparatus, a device and a storage medium, wherein the method comprises: obtaining a travel request sent by a user; determining a first to-be-selected area according to a starting position carried in the travel request; looking up to find manned vehicles which are located in the first to-be-selected area and in a free state, and broadcasting an order to the found manned vehicles; if no drivers take the order, determining a second to-be-selected area according to the starting position; looking up to find autonomous vehicles which are located in a second to-be-selected area and in a free state; selecting one from the found autonomous vehicles and scheduling said one autonomous vehicle to the user. The solution of the present disclosure can be applied to improve the user's travel efficiency.

17 Claims, 6 Drawing Sheets

(51) Int. Cl.
  *G06Q 50/30* (2012.01)
  *G01C 21/34* (2006.01)
  *G01C 21/36* (2006.01)
  *G05D 1/00* (2006.01)

(52) U.S. Cl.
  CPC ....... *G01C 21/3682* (2013.01); *G05D 1/0088* (2013.01); *G06Q 10/02* (2013.01); *G06Q 50/30* (2013.01); *G05D 2201/0213* (2013.01)

(58) Field of Classification Search
  CPC . G05D 2201/0213; G06Q 10/02; G06Q 50/30
  See application file for complete search history.

(56) References Cited

U.S. PATENT DOCUMENTS

| | | | |
|---|---|---|---|
| 2017/0083957 A1* | 3/2017 | Ross | G06Q 50/30 |
| 2017/0219362 A1* | 8/2017 | Bryson | G01C 21/206 |
| 2017/0344010 A1* | 11/2017 | Rander | B60W 30/00 |
| 2018/0060778 A1* | 3/2018 | Guo | G01C 21/343 |
| 2018/0174265 A1 | 6/2018 | Liu et al. | |
| 2018/0315146 A1* | 11/2018 | Matthiesen | G06Q 50/30 |
| 2018/0338298 A1* | 11/2018 | Pan | H04W 84/02 |
| 2018/0341880 A1* | 11/2018 | Kislovskiy | G06Q 10/02 |
| 2019/0057312 A1* | 2/2019 | Li | G06N 5/04 |
| 2019/0057476 A1* | 2/2019 | Zhang | G06Q 30/0627 |
| 2019/0057480 A1* | 2/2019 | Zhang | G06Q 30/0206 |

FOREIGN PATENT DOCUMENTS

| | | |
|---|---|---|
| CN | 105139228 A | 12/2015 |
| CN | 105635975 A | 6/2016 |
| CN | 106919994 A | 7/2017 |
| CN | 106920038 A | 7/2017 |
| CN | 106997577 A | 8/2017 |
| JP | 2003-67890 A | 3/2003 |
| JP | 2015-204005 A | 11/2015 |
| JP | 2016-115364 A | 6/2016 |
| JP | 2018-190317 A | 11/2018 |
| KR | 10-2009-0093408 A | 9/2009 |
| KR | 10-2014-0109566 A | 9/2014 |
| KR | 10-1600535 B1 | 3/2016 |
| WO | 2016/002527 A1 | 1/2016 |

* cited by examiner

VEHICLE SCHEDULING METHOD AND APPARATUS, DEVICE AND STORAGE MEDIUM

The present application claims the priority of Chinese Patent Application No. 201710831219X, filed on Sep. 15, 2017, with the title of "Vehicle scheduling method and apparatus, device and storage medium". The disclosure of the above application is incorporated herein by reference in its entirety.

FIELD OF THE DISCLOSURE

The present disclosure relates to computer application technologies, and particularly to a vehicle scheduling method and apparatus, a device and a storage medium.

BACKGROUND OF THE DISCLOSURE

At present, internet-called vehicle service increasingly prevails and provides great convenience for people's travel.

As autonomous vehicles appear and develop, it is foreseeable that more and more autonomous vehicles will appear among internet-called vehicles in the future.

An autonomous vehicle means that the vehicle's ambient environment is sensed by a vehicle-mounted sensing system, and the vehicle's steering and speed are controlled according to a road, a vehicle position and obstacle information obtained from the sensing so that the vehicle can safely and reliably travel on the road.

Figure 1:
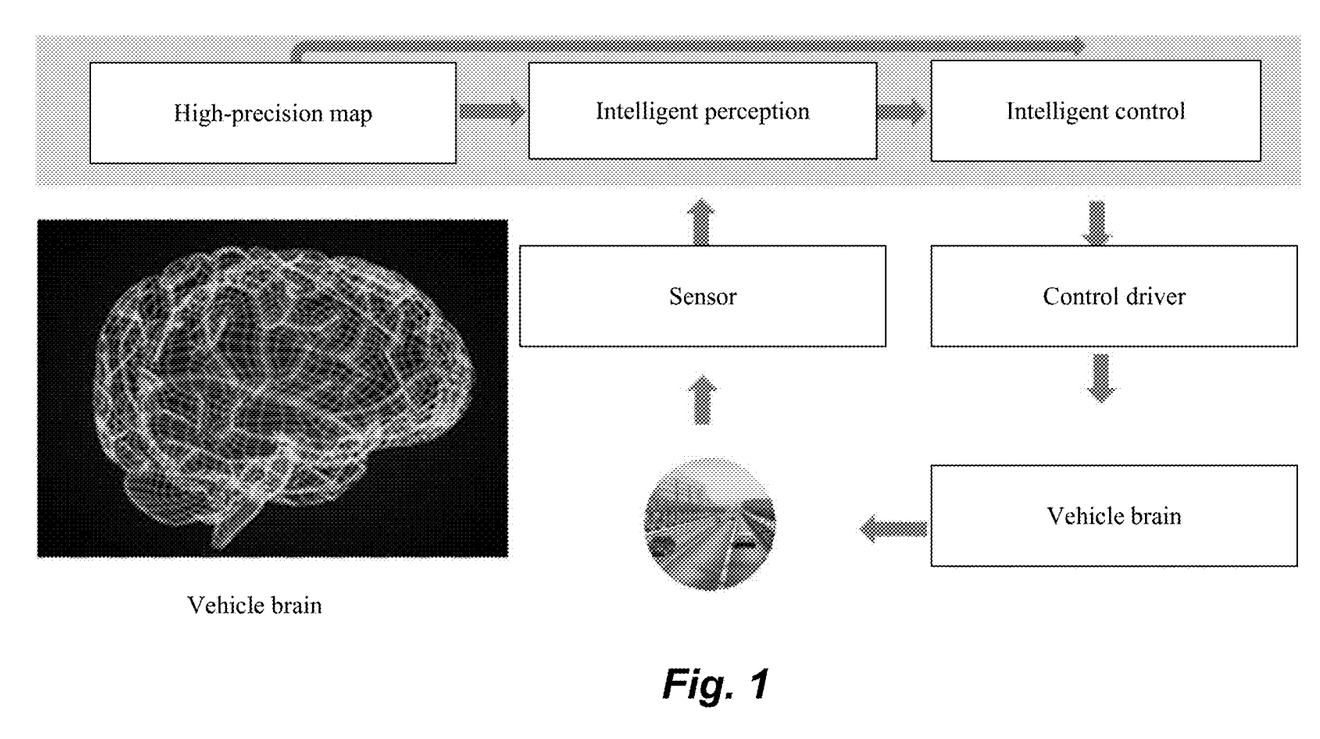
FIG. 1 is a schematic diagram of a working principle of an autonomous vehicle in the prior art.

FIG. 1 is a schematic diagram of a working principle of an autonomous vehicle in the prior art. As shown in FIG. 1, a high-precision map therein refers to a map having a centimeter-level precision which may be as fine as lane lines, and over bridge, under bridge, cameras, road signs and zebra lines can be distinguished from the map. Intelligent sensing refers to deeply understanding the vehicle's ambient environment information based on the merge of a plurality of sensors. Intelligent control refers to automated control, vehicle control and so on.

Correspondingly, this will involve an issue about hybrid scheduling of autonomous vehicles and conventional manned vehicles, namely, when a user (a passenger) sends a travel request, how to schedule a suitable manned vehicle or autonomous vehicle to the user to improve the user's travel efficiency. There is not yet an effective solution to the issue in the prior art.

SUMMARY OF THE DISCLOSURE

In view of the above, the present disclosure provides a vehicle scheduling method and apparatus, a device and a storage medium, which can improve the user's travel efficiency.

Specific technical solutions are as follows:

A vehicle scheduling method, comprising:

obtaining a travel request sent by a user;

determining a first to-be-selected area according to a starting position carried in the travel request;

looking up to find manned vehicles which are located in the first to-be-selected area and in a free state, and broadcasting an order to the found manned vehicles;

if no drivers take the order, determining a second to-be-selected area according to the starting position;

looking up to find autonomous vehicles which are located in a second to-be-selected area and in a free state;

selecting one from the found autonomous vehicles and scheduling said one autonomous vehicle to the user.

According to a preferred embodiment of the present disclosure, before obtaining the travel request sent by the user, the method further comprises:

dividing a vehicle operation area into at least two mesh units;

the determining a first to-be-selected area comprises:

determining a mesh unit where the starting position lies;

regarding an area at least including the mesh unit where the starting position lies as a first to-be-selected area.

According to a preferred embodiment of the present disclosure, after obtaining the travel request sent by the user, the method further comprises:

determining an order-taking probability of taking the travel request;

the regarding an area at least including the mesh unit where the starting position lies as a first to-be-selected area comprises:

comparing the order-taking probability with a preset threshold;

regarding the mesh unit where the starting position lies and a surrounding area of a first predetermined size as the first to-be-selected area if the order-taking probability is larger than or equal to the threshold;

regarding the mesh unit where the starting position lies and a surrounding area of a second predetermined size as the first to-be-selected area if the order-taking probability is smaller than the threshold;

the area of the first predetermined size is smaller than the area of the second predetermined size.

According to a preferred embodiment of the present disclosure, the determining an order-taking probability of taking the travel request comprises:

evaluating the order-taking probability of taking the travel request by using an evaluation model obtained by training historical orders.

According to a preferred embodiment of the present disclosure, after broadcasting an order to the found manned vehicles, the method further comprises:

if there are drivers taking the order, selecting one manned vehicle from the order-taken manned vehicles and scheduling said one manned vehicle to the user.

According to a preferred embodiment of the present disclosure, the determining a second to-be-selected area according to the starting position comprises:

determining the mesh unit where the starting position lies;

regarding the mesh unit where the starting position lies and a surrounding area of a third predetermined size as the second to-be-selected area.

According to a preferred embodiment of the present disclosure, after dividing a vehicle operation area into at least two mesh units, the method further comprises:

with respect to each mesh unit, respectively determining a list of Points of Interest POIs which are located in the mesh unit and meet parking rules;

the selecting one from the found autonomous vehicles and scheduling said one autonomous vehicle to the user comprises:

determining the mesh unit where the starting position lies;

displaying a POI list corresponding to the mesh unit where the starting position lies to the user;

regarding a POI selected by the user from the POI list as the user's get-on position;

respectively determining time spent by each of the found autonomous vehicles in reaching the get-on position;

ranking the found autonomous vehicles in an ascending order of the spent time;

scheduling the autonomous vehicle ranking the first to the user.

According to a preferred embodiment of the present disclosure, after ranking the found autonomous vehicles, the method further comprises:

removing autonomous vehicles incompliant with the user's inclinations from the ranked autonomous vehicles according to obtained user's user inclination information.

A vehicle scheduling apparatus, comprising: an obtaining unit, a first scheduling unit and a second scheduling unit;

the obtaining unit is configured to obtain a travel request sent by a user, and send the travel request to the first scheduling unit and second scheduling unit;

the first scheduling unit is configured to determine a first to-be-selected area according to a starting position carried in the travel request; look up to find manned vehicles which are located in the first to-be-selected area and in a free state, and broadcast an order to the found manned vehicles; if no drivers take the order, notify the second scheduling unit to perform its own function;

the second scheduling unit is configured to determine a second to-be-selected area according to the starting position; look up to find autonomous vehicles which are located in a second to-be-selected area and in a free state; select one from the found autonomous vehicles and schedule said one autonomous vehicle to the user.

According to a preferred embodiment of the present disclosure, the apparatus further comprises: a pre-processing unit;

the pre-processing unit is configured to divide a vehicle operation area into at least two mesh units;

the first scheduling unit determines a mesh unit where the starting position lies, and regards an area at least including the mesh unit where the starting position lies as a first to-be-selected area.

According to a preferred embodiment of the present disclosure, the first scheduling unit is further configured to, determine an order-taking probability of taking the travel request;

compare the order-taking probability with a preset threshold;

regard the mesh unit where the starting position lies and a surrounding area of a first predetermined size as the first to-be-selected area if the order-taking probability is larger than or equal to the threshold;

regard the mesh unit where the starting position lies and a surrounding area of a second predetermined size as the first to-be-selected area if the order-taking probability is smaller than the threshold;

the area of the first predetermined size is smaller than the area of the second predetermined size.

According to a preferred embodiment of the present disclosure, the first scheduling unit, by using an evaluation model obtained by training historical orders, evaluates the order-taking probability of taking the travel request.

According to a preferred embodiment of the present disclosure, the first scheduling unit is further configured to, if there are drivers taking the order, select one manned vehicle from the order-taken manned vehicles and schedule said one manned vehicle to the user.

According to a preferred embodiment of the present disclosure, the second scheduling unit determines the mesh unit where the starting position lies, and regards the mesh unit where the starting position lies and a surrounding area of a third predetermined size as the second to-be-selected area.

According to a preferred embodiment of the present disclosure, the pre-processing unit is further configured to, with respect to each mesh unit, respectively determine a list of Points of Interest POIs which are located in the mesh unit and meet parking rules;

the second scheduling unit determines the mesh unit where the starting position lies, displays a POI list corresponding to the mesh unit where the starting position lies to the user, regards a POI selected by the user from the POI list as the user's get-on position, respectively determines time spent by each of the found autonomous vehicles in reaching the get-on position, ranks the found autonomous vehicles in an ascending order of the spent time, and schedules the autonomous vehicle ranking the first to the user.

According to a preferred embodiment of the present disclosure, the second scheduling unit is further configured to, after ranking the found autonomous vehicles, remove autonomous vehicles incompliant with the user's inclinations from the ranked autonomous vehicles according to obtained user's user inclination information.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the above solutions of the present disclosure, it is possible to obtain a travel request sent by a user; determine a first to-be-selected area according to a starting position carried in the travel request; look up to find manned vehicles which are located in the first to-be-selected area and in a free state, and broadcast an order to the found manned vehicles; determine a second to-be-selected area according to the starting position if nobody takes the order; look up to find autonomous vehicles which are located in a second to-be-selected area and in a free state; select one from the found autonomous vehicles and schedule said one autonomous vehicle to the user, thereby achieving reasonable scheduling of the autonomous vehicles and manned vehicles and thereby improving the user's travel efficiency.

DETAILED DESCRIPTION OF PREFERRED EMBODIMENTS

In view of problems existing in the prior art, the present disclosure provides a hybrid scheduling manner of autonomous vehicles and manned vehicles, which can improve the user's travel efficiency, save the driver and passenger's time and resources, implement complementation of advantages of the two travel manners, and enrich operation policies of products.

Technical solutions of the present disclosure will be described in more detail with reference to figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 2:
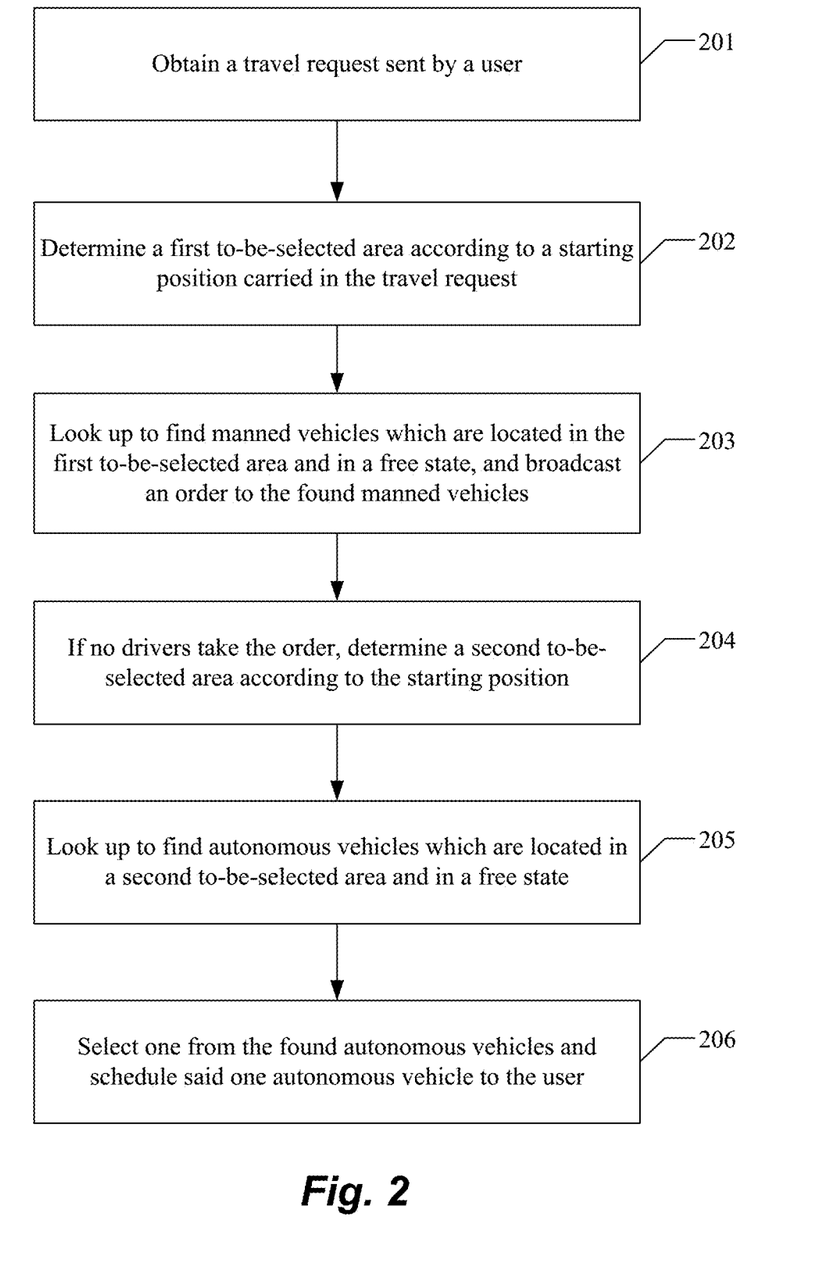
FIG. 2 is a flow chart of an embodiment of a vehicle scheduling method according to the present disclosure.

FIG. 2 is a flow chart of an embodiment of a vehicle scheduling method according to the present disclosure. As shown in FIG. 2, the embodiment comprises the following specific implementation mode.

At 201 is obtained a travel request sent by a user.

At 202 is determined a first to-be-selected area according to a starting position carried in the travel request.

At 203, look up to find manned vehicles which are located in the first to-be-selected area and in a free state, and broadcast an order to the found manned vehicles.

At 204, determine a second to-be-selected area according to the starting position if nobody takes the order.

At 205, look up to find autonomous vehicles which are located in a second to-be-selected area and in a free state.

At 206, select one from the found autonomous vehicles and schedule said one autonomous vehicle to the user.

It can be seen that in the above embodiment, a manned vehicle may be preferentially scheduled to the user due to factors such as the user's easy communication with the driver; if no driver of the manned vehicle takes the order due to factors such as weather conditions and traffic conditions if the user goes from location A to location B at a certain time, an autonomous vehicle can be scheduled for the user. The autonomous vehicle can disregard the above factors and ensure that the user's travel request can be processed in time.

A specific manner of scheduling the manned vehicle and autonomous vehicle is described below respectively.

1) Scheduling of the Manned Vehicle

In practical application, a vehicle operation area may be pre-divided into at least two mesh units.

For example, it is possible to regard the whole city as a vehicle operation area, and according to the high-precision map, divide the whole city into a plurality of mesh units.

A specific number of mesh units may depend on actual needs. For example, division may be performed in a manner of each mesh unit sized one square kilometer (length and width are both 1000 meters).

The user may sends a travel request through a smart terminal such as a mobile phone, and the travel request may carry the user's starting position and finishing position.

Correspondingly, after the user's travel request is obtained, it is possible to first determine the mesh unit where its starting position lies, then regard an area at least including the mesh unit where the starting position lies as a first to-be-selected area, look up to find manned vehicles which are located in the first to-be-selected area and in a free state, and broadcast an order to the found manned vehicles, namely, look for a manned vehicle that may take the order.

In addition to the mesh unit where the starting position lies, the first to-be-selected area may further include other areas, e.g., areas which are around the mesh unit where the starting position lies and are of a predetermined size.

A specific value of the areas of the predetermined size may depend on actual situation. For example, it is feasible to, after obtaining the travel request sent by the user, further determine an order-taking probability of taking the travel request, and then compare the order-taking probability with a preset threshold, regard the mesh unit where the starting position lies and a surrounding area of a first predetermined size as the first to-be-selected area if the order-taking probability is larger than or equal to the threshold, or regard the mesh unit where the starting position lies and a surrounding area of a second predetermined size as the first to-be-selected area if the order-taking probability is smaller than the threshold, wherein the area of the first predetermined size is smaller than the area of the second predetermined size.

That is to say, if the order-taking probability is smaller, the first to-be-selected area may be increased to increase the number of the found manned vehicles that are located in the first to-be-selected area and in a free state, thereby increasing the probability that the user's travel request is taken.

Specific values of the threshold, the area of the first predetermined size and the area of the second predetermined size all may depend on actual needs. For example, if the order-taking probability is larger than or equal to 0.6, the mesh unit where the starting position lies and a surrounding 2 km*2 km area as the first to-be-selected area; if the order-taking probability is smaller than 0.6, the mesh unit where the starting position lies and a surrounding 3 km*3 km area as the first to-be-selected area.

Then, it is feasible to look up to find manned vehicles which are located in the first to-be-selected area and in a free state, and broadcast an order to the found manned vehicles. If there are still not drivers taking order after the order is broadcast twice, it is believed that no drivers take the order. Then, autonomous vehicles are scheduled to the user. If there are drivers taking the order, one manned vehicle is selected from the order-taken manned vehicles and scheduled to the user.

Figure 3:
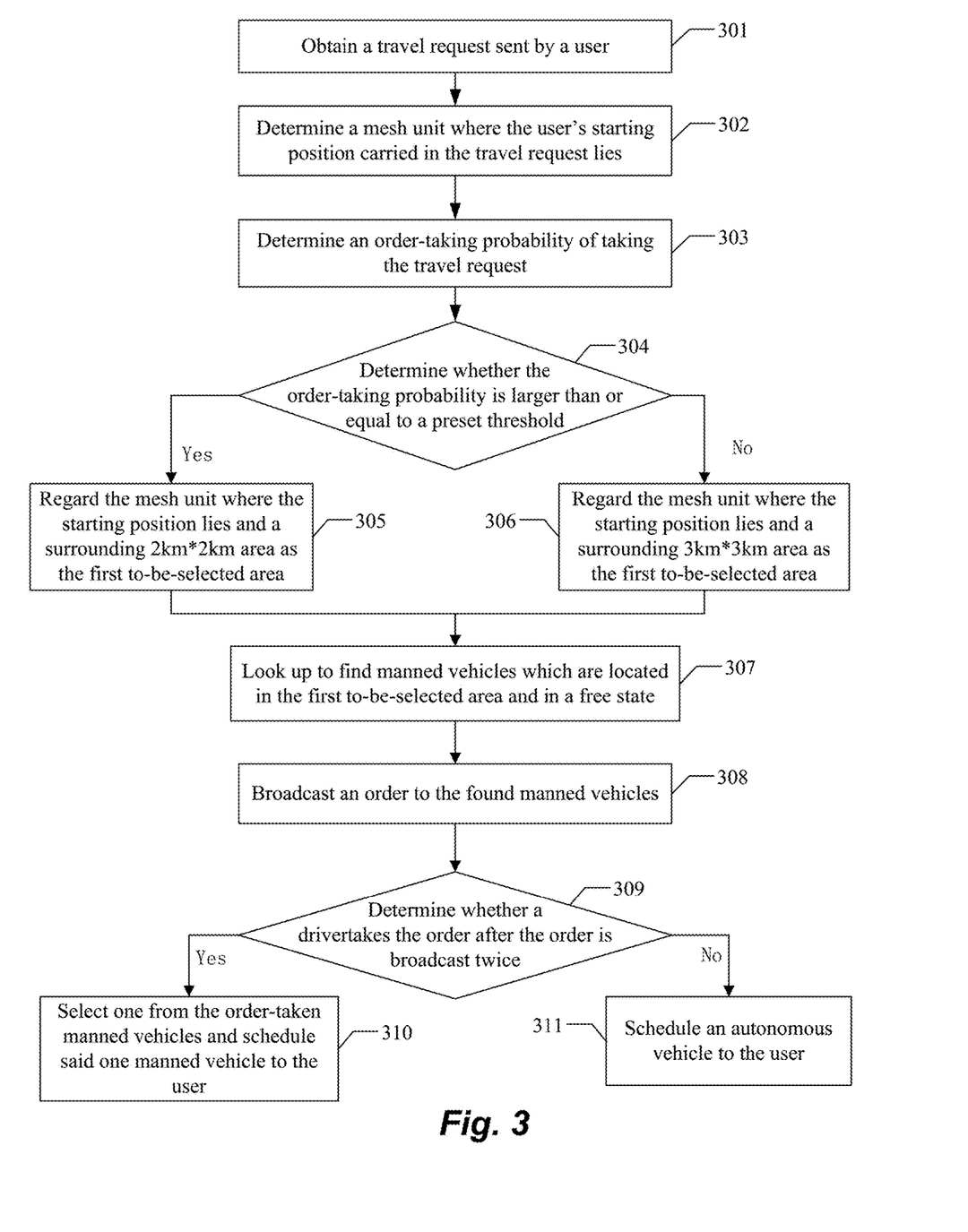
FIG. 3 is a flow chart of an embodiment of a manned vehicle scheduling method according to the present disclosure.

Based on the above introduction, FIG. 3 is a flow chart of an embodiment of a manned vehicle scheduling method according to the present disclosure. As shown in FIG. 3, the embodiment comprises the following specific implementation mode.

At 301, obtain a travel request sent by a user.

The user may sends the travel request through a smart terminal such as a mobile phone, and the travel request may carry the user's starting position and finishing position.

At 302, determine a mesh unit where the user's starting position carried in the travel request lies.

It is feasible to respectively allocate a different ID for each mesh unit and respectively record position information of each mesh unit, and thereby conveniently determine the mesh unit where the user's starting position lies.

At 303, determine an order-taking probability of taking the travel request.

Specifically, it is feasible to, by using an evaluation model obtained by training historical orders, evaluate the order-taking probability of taking the travel request.

It is feasible to, according to information in the historical orders, pre-train to obtain an evaluation model whose input may be basic information of the order and whose output is the order-taking probability.

For example, the basic information of the order may comprise: time (time at which the user sends the travel request), the user's starting position, finishing position and weather conditions.

How to train to obtain the evaluation model is of prior art. As such, the order-taking probability may be evaluated, namely, the order-taking probability that the user's travel request is taken may be evaluated according to the evaluation model obtained by training and the basic information of the current order.

At 304, determine whether the order-taking probability is larger than or equal to a preset threshold, and performing 305 if yes, or performing 306 if no.

At 305, regard the mesh unit where the starting position lies and a surrounding 2 km*2 km area as the first to-be-selected area, and then perform 307.

At 306, regard the mesh unit where the starting position lies and a surrounding 3 km*3 km area as the first to-be-selected area, and then perform 307.

At 307, look up to find manned vehicles which are located in the first to-be-selected area and in a free state.

To facilitate lookup of vehicles, it is feasible to, with respect to each mesh unit, respectively construct and maintain vehicle-related inverted index table and forward index table as shown below respectively.

TABLE 1

Inverted index table

| key | value | | |
|---|---|---|---|
| boxid | car_id1 | car_id2 | ... |

TABLE 2

Forward index table

| key | value | | | | |
|---|---|---|---|---|---|
| car_id1 | Latitude and longitude | speed | state | Vehicle model | Others | wherein "boxid" represents an ID of a mesh unit;
"car_id" represents an ID of the vehicle.

Table 1 records which vehicles are in the mesh unit. Table 2 records information such as position, speed and state of each vehicle. Table 1 and Table 2 can be updated at any time according to actual change situations.

As such, it is possible to look up to find manned vehicles which are located in the first to-be-selected area and in a free state through Table 1 and Table 2.

Certainly, in practical application, it is possible to employ other manners that can be envisaged by those skilled in the art, to look up to find manned vehicles which are located in the first to-be-selected area and in a free state, not limited to those shown above.

At 308, broadcast an order to the found manned vehicles.
How to broadcast the order is of prior art.

At 309, determine whether a driver takes the order after the order is broadcast twice, and perform 310 if yes, or perform 311 if no.

At 310, select one from the order-taken manned vehicles and schedule said one manned vehicle to the user.

If only one manned vehicle takes the order, this manned vehicle is scheduled to the user. If more than one manned vehicle take the order, one manned vehicle is selected by comprehensively considering factors such as order-taking confirmation time, drivers' faith and distance from the user, and scheduled to the user. How to select depends on actual needs.

At 311, schedule an autonomous vehicle to the user.

If no drivers of manned vehicles take the order, an autonomous vehicle may be scheduled for the user.

2) Scheduling of Autonomous Vehicles

As stated above, it is possible to pre-divide a vehicle operation area into at least two mesh units, and with respect to each mesh unit, respectively determine a list of Points of Interest (POI) that are located in the mesh unit and meet parking rules.

A driver of a manned vehicle may select a suitable parking location to stop and park the vehicle by observing and judging. Since an autonomous vehicle usually employs an autonomous driving mode, this manner is not applicable for the autonomous vehicle, and correspondingly it is necessary to pre-select POIs meeting parking rules for the autonomous vehicle.

Specifically, it is feasible to, with respect to each mesh unit, respectively determine POIs which are located in the mesh unit and meet parking rules in a manner such as machine recognition and manual check. Meeting parking rules means meeting requirements about "parking, temporary parking, and parking and leaving of vehicles" as set forth in *Road Traffic Safety Law of the People's Republic of China and Regulation on the Implementation of the Road Traffic Safety Law of the People's Republic of China*. POIs meeting parking rules refer to locations that meet the parking rules and may be used to park/pull in the vehicles.

In addition, it is feasible to, with respect to each mesh unit, respectively generate inverted index table and forward index table in the following forms:

TABLE 3

Inverted index table

| key | value | | |
|---|---|---|---|
| boxid | poi_id1 | poi_id2 | ... |

TABLE 4

Forward index table

| key | value | | | | |
|---|---|---|---|---|---|
| poi_id1 | Latitude and longitude A | Latitude and longitude B | Latitude and longitude C | Latitude and longitude D | Name ... | wherein "boxid" represents an ID of a mesh unit;
"poi_id" represents an ID of a POI located in the mesh unit;
"Latitude and longitude A", "latitude and longitude B", "latitude and longitude C" and "latitude and longitude D" respectively represent latitude and longitude of four vertexes of the POI identified by poi_id1.

"Name" represents an actual name of the POI, for example, "north gate of ** residential quarter".

As such, when the autonomous vehicle needs to be scheduled for the user, it is feasible to first determine the mesh unit where the starting position lies according to the starting position carried in the travel request, and regard the mesh unit where the starting position lies and a surrounding area of a third predetermined size as the second to-be-selected area.

Then, it is feasible to look up to find autonomous vehicles which are located in the second to-be-selected area and in a free state, and select one from the found autonomous vehicles and schedule said one autonomous vehicle to the user.

Specifically, it is feasible to display a POI list corresponding to the mesh unit where the starting position lies, regard a POI selected by the user from the POI list as the user's get-on position, respectively determine time spent by each of the found autonomous vehicles in reaching the get-on position, rank the found autonomous vehicles in an ascending order of the spent time, and schedule the autonomous vehicle ranking the first to the user.

In addition, preferably, after completion of the ranking, it is also feasible to remove autonomous vehicles incompliant with the user's inclinations from the ranked autonomous vehicles according to obtained user's user inclination information.

Then, it is feasible to send a scheduling instruction to the autonomous vehicle scheduled to the user so that the autonomous vehicle automatically drives from its current position to the user's get-on position. After the user also reaches the get-on position and scans a code and inputs a verification code and completes identity authentication, the autonomous vehicle opens the door, and the user gets onboard.

In addition, while displaying a POI list corresponding to the mesh unit where the starting position lies to the user, it is further possible to display a POI list corresponding to the mesh unit where the finishing position lies, so that the user selects one POI from the list as a get-off position, and notifies the autonomous vehicle.

As such, after the autonomous vehicle confirms that the user gets onboard, it carries the user from the get-on position to the get-off position in an autonomous driving manner, and then prompts the user of arrival at the destination.

Figure 4:
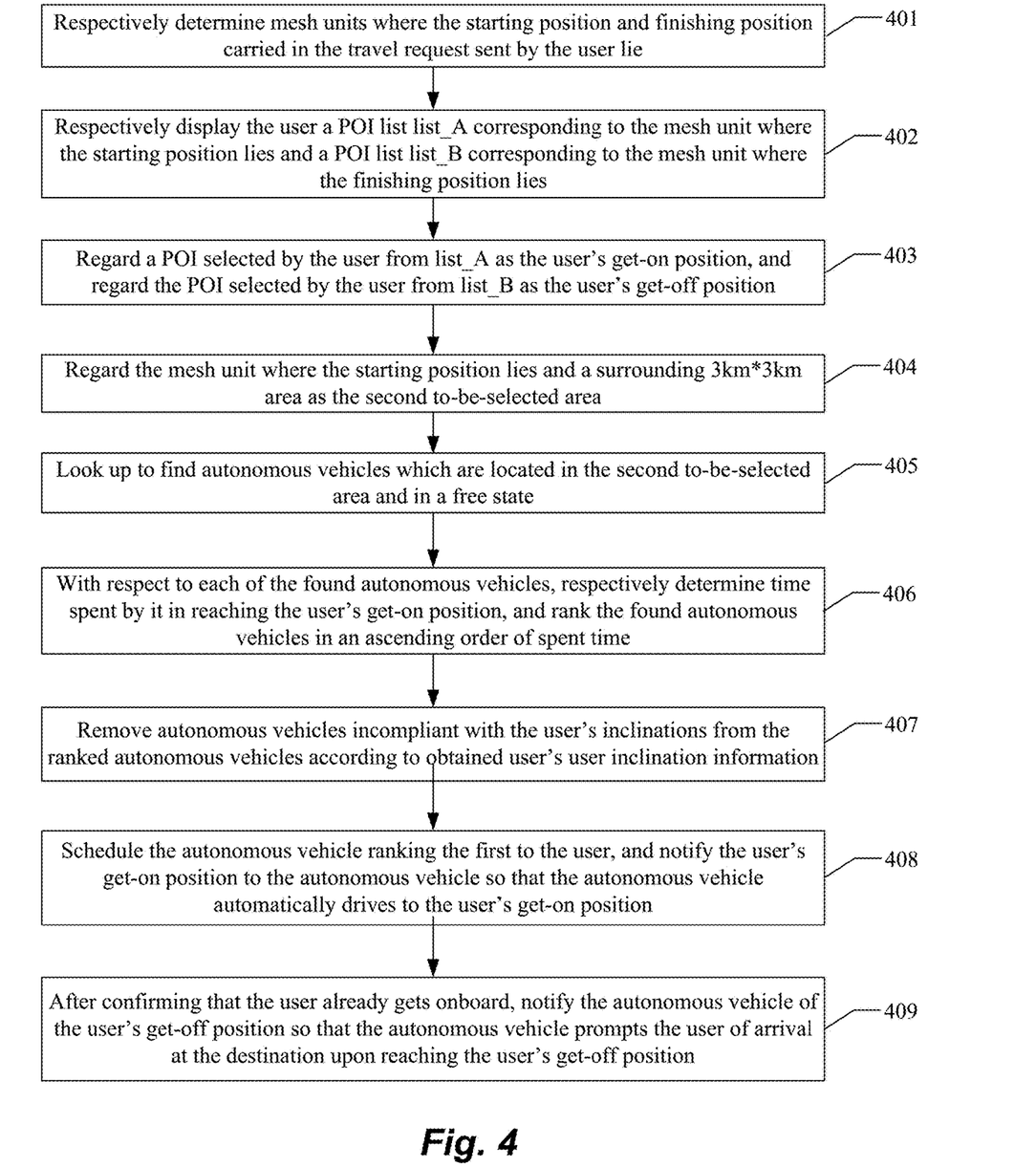
FIG. 4 is a flow chart of an embodiment of an autonomous vehicle scheduling method according to the present disclosure.

Based on the above introduction, FIG. 4 is a flow chart of an embodiment of an autonomous vehicle scheduling method according to the present disclosure. As shown in FIG. 4, the embodiment comprises the following specific implementation mode.

At 401, respectively determine mesh units where the starting position and finishing position carried in the travel request sent by the user lie.

At 402, respectively display the user a POI list list_A corresponding to the mesh unit where the starting position lies and a POI list list_B corresponding to the mesh unit where the finishing position lies.

It is possible to obtain the POI list corresponding to the mesh unit where the starting position lies and the POI list corresponding to the mesh unit where the finishing position lies according to Table 3 and Table 4.

Take the POI list corresponding to the mesh unit where the starting position lies as an example. It is feasible to first determine which POIs are included in the mesh unit where the starting position lies according to Table 3, then determine the name of each POI according to Table 4, and then display the POI list comprised of names of respective POIs to the user.

At 403, regard a POI selected by the user from list_A as the user's get-on position, and regard the POI selected by the user from list_B as the user's get-off position.

The user may, according to his own situations, select the get-on position and get-off position respectively. Take the get-on position as an example. The position might be the same as or different from the user's starting position. Again for example, if the user's starting position does not meet the parking rules and the vehicle cannot park at the user's starting position, the user's starting position and get-on position will be different, and the get-on position is another position not far away from the user.

At 404, regard the mesh unit where the starting position lies and a surrounding 3 km*3 km area as the second to-be-selected area.

At 405, look up to find autonomous vehicles which are located in the second to-be-selected area and in a free state.

At 406, with respect to each of the found autonomous vehicles, respectively determine time spent by it in reaching the user's get-on position, and rank the found autonomous vehicles in an ascending order of spent time.

It is possible to estimate time spent by autonomous vehicle in reaching the user's get-on position according to the prior art, according to the distance between the autonomous vehicle and the user's get-on position, a travel speed of the autonomous vehicle, road conditions and so on.

At 407, remove autonomous vehicles incompliant with the user's inclinations from the ranked autonomous vehicles according to obtained user's user inclination information.

The user inclination information may comprise vehicle displacement, space, color, model and so on to which the user is inclined.

How to obtain the user's user inclination information may depend on actual needs and is not limited. For example, the user may set the user inclination information duly when he sends the travel request.

Through the above processing, the autonomous vehicle scheduled to the user can better meet the user's actual needs, and the scheduling process becomes more personalized.

At 408, schedule the autonomous vehicle ranking the first to the user, and notify the user's get-on position to the autonomous vehicle so that the autonomous vehicle automatically drives to the user's get-on position.

After the user reaches the get-on position, he scans a code and inputs a verification code and completes identity authentication, and then the autonomous vehicle opens the door, and the user gets onboard.

At 409, after confirming that the user already gets onboard, notify the autonomous vehicle of the user's get-off position so that the autonomous vehicle prompts the user of arrival at the destination upon reaching the user's get-off position.

The above depictions are only for illustration purpose and not intended to limit the technical solution of the present disclosure. For example, it is also possible to notify the autonomous vehicle of the user's get-on position and get-off position together.

Figure 5:
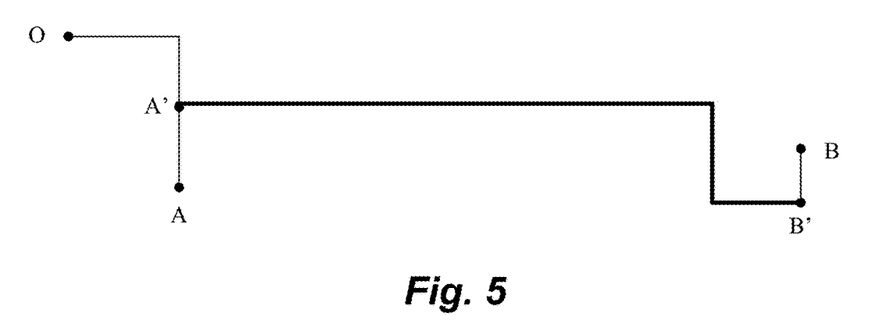
FIG. 5 is a schematic diagram of relationship of the user's starting position, finishing position, get-on position and get-off position according to the present disclosure.

FIG. 5 is a schematic diagram of relationship of the user's starting position, finishing position, get-on position and get-off position according to the present disclosure.

As shown in FIG. 5, the user selects a POI from the POI list corresponding to the displayed starting position as the get-on position A', and selects a POI from the POI list corresponding to the displayed finishing position as the get-off position B'.

The autonomous vehicle scheduled to the user drives from its position O to the get-on position A'. The user walks from the starting position A to the get-on position A'. After the user reaches the get-on position and scans a code and inputs a verification code and completes identity authentication, the autonomous vehicle opens the door, and the user gets onboard.

After the autonomous vehicle automatically drives to the get-off position B', it prompts the user of arrival at the destination, the user gets out of the vehicle, walks to the finishing position B and complete his travel.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In summary, the above method embodiments provide a hybrid manner of scheduling the autonomous vehicle and manned vehicle, which can improve the user's travel efficiency, save the driver and passenger's time and resources, implement complementation of advantages of the two travel manners, and enrich operation policies of products.

The above introduces method embodiments. The solutions of the present disclosure will be further described through apparatus embodiments.

Figure 6:
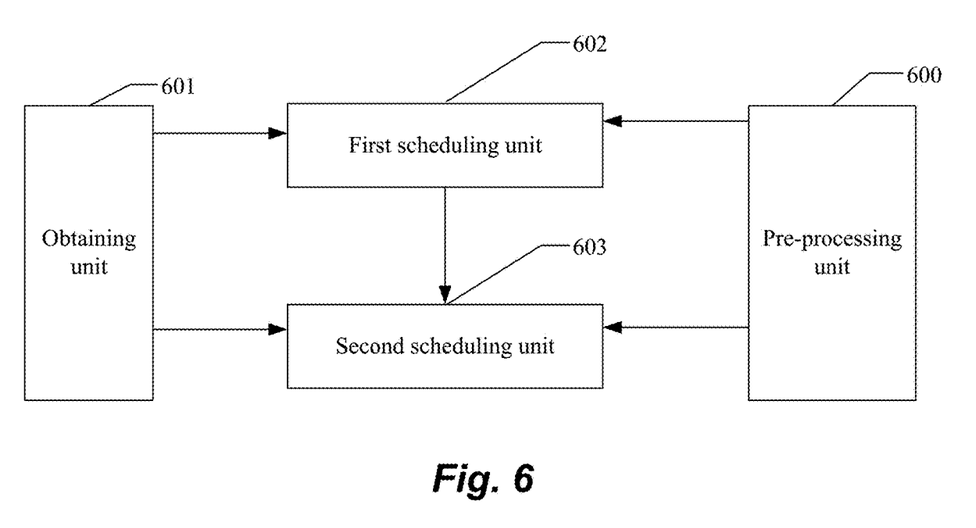
FIG. 6 is a structural schematic diagram of components of an embodiment of a vehicle scheduling apparatus according to the present disclosure.

FIG. 6 is a structural schematic diagram of components of an embodiment of a vehicle scheduling apparatus according to the present disclosure. As shown in FIG. 6, the apparatus comprises: an obtaining unit 601, a first scheduling unit 602 and a second scheduling unit 603.

The obtaining unit 601 is configured to obtain a travel request sent by a user, and send the travel request to the first scheduling unit 602 and second scheduling unit 603.

The first scheduling unit 602 is configured to determine a first to-be-selected area according to a starting position carried in the travel request; look up to find manned vehicles which are located in the first to-be-selected area and in a free state, and broadcast an order to the found manned vehicles; if no drivers take the order, notify the second scheduling unit 603 to perform its own function;

The second scheduling unit 603 is configured to determine a second to-be-selected area according to the starting position; look up to find autonomous vehicles which are located in a second to-be-selected area and in a free state; select one from the found autonomous vehicles and schedule said one autonomous vehicle to the user.

As shown in FIG. 6, the apparatus may further comprise: a pre-processing unit 600.

The pre-processing unit 600 is configured to divide a vehicle operation area into at least two mesh units.

For example, it is possible to regard the whole city as a vehicle operation area, and according to the high-precision map, divide the whole city into a plurality of mesh units.

A specific number of mesh units may depend on actual needs. For example, division may be performed in a manner of each mesh unit sized one square kilometer (length and width are both 1000 meters).

The first scheduling unit 602 is configured to, after the user's travel request is obtained, first determine the mesh unit where its starting position lies, then regard an area at least including the mesh unit where the starting position lies as a first to-be-selected area, look up to find manned vehicles which are located in the first to-be-selected area and in a free state, and broadcast an order to the found manned vehicles, namely, look for a manned vehicle that may take the order.

In addition to the mesh unit where the starting position lies, the first to-be-selected area may further include other areas, e.g., areas which are around the mesh unit where the starting position lies and are of a predetermined size.

A specific value of the areas of the predetermined size may depend on actual situation. For example, after the travel request sent by the user is obtained, the first scheduling unit 602 may further determine an order-taking probability of taking the travel request, and then compare the order-taking probability with a preset threshold, regard the mesh unit where the starting position lies and a surrounding area of a first predetermined size as the first to-be-selected area if the order-taking probability is larger than or equal to the threshold, or regard the mesh unit where the starting position lies and a surrounding area of a second predetermined size as the first to-be-selected area if the order-taking probability is smaller than the threshold, wherein the area of the first predetermined size is smaller than the area of the second predetermined size.

That is to say, if the order-taking probability is smaller, the first to-be-selected area may be increased to increase the number of the found manned vehicles that are located in the first to-be-selected area and in a free state, thereby increasing the probability that the user's travel request is taken.

The first scheduling unit 602 is configured to, by using an evaluation model obtained by training historical orders, evaluate the order-taking probability of taking the travel request.

Then, the first scheduling unit 602 is configured to look up to find manned vehicles which are located in the first to-be-selected area and in a free state, and broadcast an order to the found manned vehicles. If there are still not drivers taking order after the order is broadcast twice, it is believed that no drivers take the order. Then, the second scheduling unit 603 schedules autonomous vehicles to the user. If there are drivers taking the order, one manned vehicle is selected from the order-taken manned vehicles and scheduled to the user.

Specifically, if only one manned vehicle takes the order, the first scheduling unit 602 may schedule this manned vehicle to the user. If more than one manned vehicle takes the order, the first scheduling unit 602 selects one manned vehicle by comprehensively considering factors such as order-taking confirmation time, drivers' faith and distance from the user, and schedules it to the user. How to select depends on actual needs.

As stated above, the pre-processing unit 600 may pre-divide a vehicle operation area into at least two mesh units. In addition, with respect to each mesh unit, the pre-processing unit 600 may further respectively determine a list of POIs that are located in the mesh unit and meet parking rules.

For example, it is feasible to, with respect to each mesh unit, respectively determine POIs which are located in the mesh unit and meet parking rules in a manner such as machine recognition and manual check. Meeting parking rules means meeting requirements about "parking, temporary parking, and parking and leaving of vehicles" as set forth in *Road Traffic Safety Law of the People's Republic of*

China and Regulation on the Implementation of the Road Traffic Safety Law of the People's Republic of China. POIs meeting parking rules refer to locations that meet the parking rules and may be used to park/pull in the vehicles.

When the autonomous vehicle needs to be scheduled for the user, the second scheduling unit 603 may first determine the mesh unit where the starting position lies according to the starting position carried in the travel request, and regard the mesh unit where the starting position lies and a surrounding area of a third predetermined size as the second to-be-selected area.

Then, the second scheduling unit 603 may look up to find autonomous vehicles which are located in the second to-be-selected area and in a free state, and select one from the found autonomous vehicles and schedule said one autonomous vehicle to the user.

Specifically, the second scheduling unit 603 displays a POI list corresponding to the mesh unit where the starting position lies to the user, regard a POI selected by the user from the POI list as the user's get-on position, respectively determine time spent by each of the found autonomous vehicles in reaching the get-on position, rank the found autonomous vehicles in an ascending order of the spent time, and schedule the autonomous vehicle ranking the first to the user.

Preferably, after completion of the ranking, the second scheduling unit 603 may remove autonomous vehicles incompliant with the user's inclinations from the ranked autonomous vehicles according to obtained user's user inclination information.

Reference may be made to corresponding depictions in the aforesaid method embodiment for a specific workflow of the apparatus embodiment shown in FIG. 6. The workflow is not detailed any more.

In summary, the above apparatus embodiment provides a hybrid manner of scheduling the autonomous vehicle and manned vehicle, which can improve the user's travel efficiency, save the driver and passenger's time and resources, implement complementation of advantages of the two travel manners, and enrich operation policies of products.

Figure 7:
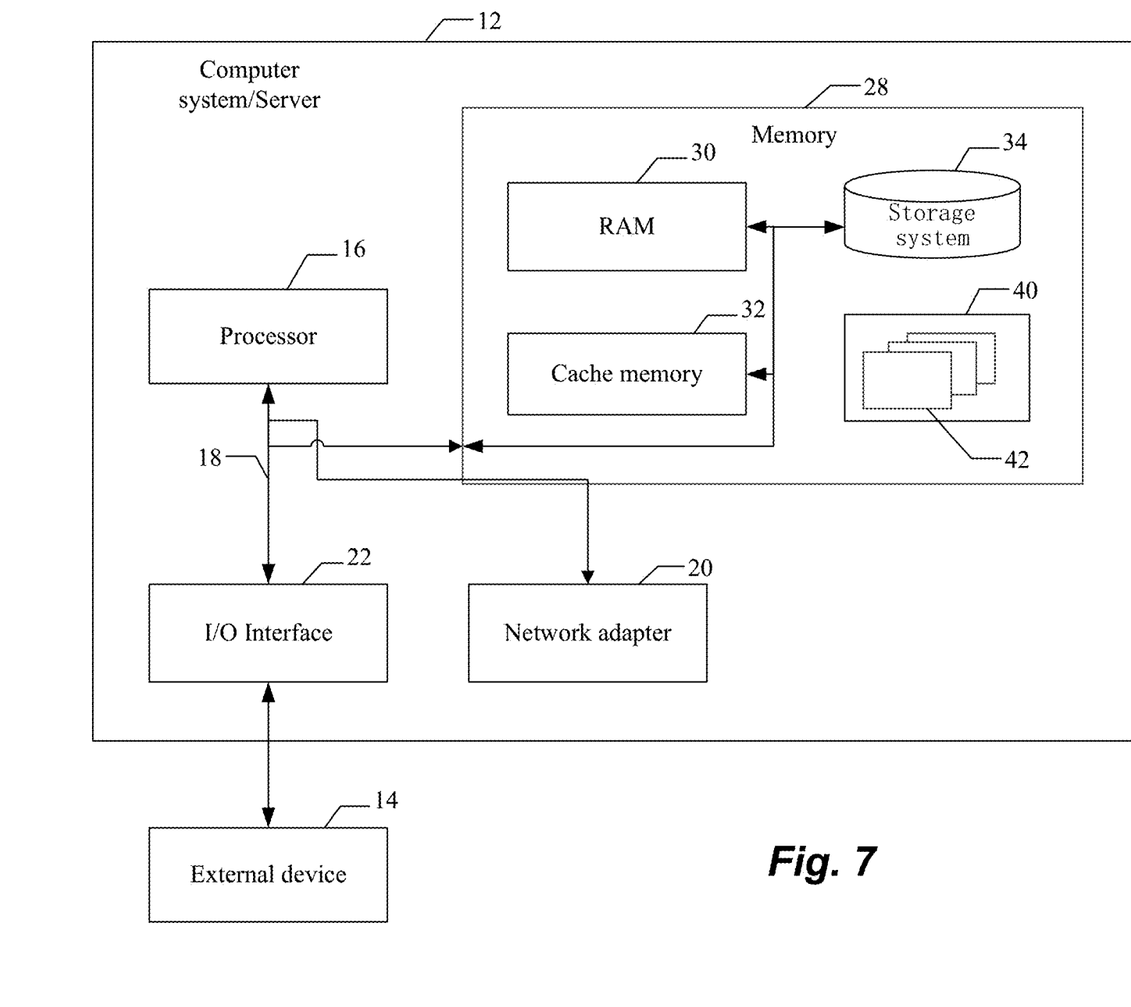
FIG. 7 illustrates a block diagram of an example computer system/server 12 adapted to implement an implementation mode of the present disclosure.

FIG. 7 illustrates a block diagram of an example computer system/server 12 adapted to implement an implementation mode of the present disclosure. The computer system/server 12 shown in FIG. 7 is only an example and should not bring about any limitation to the function and scope of use of the embodiments of the present disclosure.

As shown in FIG. 7, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 7, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 2, 3 or 4, namely, obtain a travel request sent by a user; determine a first to-be-selected area according to a starting position carried in the travel request; look up to find manned vehicles which are located in the first to-be-selected area and in a free state, and broadcast an order to the found manned vehicles; determine a second to-be-selected area according to the starting position if nobody takes the order; look up to find autonomous vehicles which are located in a second to-be-selected area and in a free state; select one from the found autonomous vehicles and schedule said one autonomous vehicle to the user.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 2, 3 or 4.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented vehicle scheduling method, wherein the method comprises:
   obtaining a travel request sent by a user;
   determining a first area according to a starting position carried in the travel request;
   looking up to find manned vehicles which are located in the first area and in a free state, and if manned vehicles are found, broadcasting an order to the found manned vehicles;
   if no drivers take the order, determining a second area according to the starting position;
   looking up to find autonomous vehicles which are located in the second area and in a free state; and if autonomous vehicles are found, selecting one from the found autonomous vehicles and scheduling said one autonomous vehicle to travel to the user,
   wherein the determining the first area according to the starting position carried in the travel request comprises:
   determining an order-taking probability of drivers of found manned vehicles taking the order in an area of a first predetermined size including the staring position;
   comparing the order-taking probability with a preset threshold;
   regarding the area of the first predetermined size including the starting position as the first area if the order-taking probability is larger than or equal to the threshold;
   regarding an area of a second predetermined size including the starting position as the first area if the order-taking probability is smaller than the reset threshold;
   wherein the area of the first predetermined size is smaller than the area of the second predetermined size.

2. The method according to claim 1, wherein
   before obtaining the travel request sent by the user, the method further comprises:
   dividing a vehicle operation area into at least two mesh units;
   the determining the first area comprises:
   determining the mesh unit where the starting position lies;

regarding an area at least including the mesh unit where the starting position lies as the first area.

3. The method according to claim 2, wherein the determining the second area according to the starting position comprises:
determining the mesh unit where the starting position lies;
regarding the mesh unit where the starting position lies and a surrounding area of a third predetermined size as the second area.

4. The method according to claim 2, wherein after dividing the vehicle operation area into at least two mesh units, the method further comprises:
with respect to each mesh unit, respectively determining a list of Points of Interest POIs which are located in the mesh unit and have parking for vehicles;
the selecting one from the found autonomous vehicles and scheduling said one autonomous vehicle to travel to the user comprises:
determining the mesh unit where the starting position lies;
displaying a POI list corresponding to the mesh unit where the starting position lies to the user;
regarding a POI selected by the user from the POI list as a user's get-on position;
respectively determining time that would be spent by each of the found autonomous vehicles in reaching the get-on position;
ranking the found autonomous vehicles in an ascending order of the spent time;
scheduling the autonomous vehicle ranking the first to travel to the user.

5. The method according to claim 4, wherein after ranking the found autonomous vehicles, the method further comprises:
removing autonomous vehicles incompliant with a user's inclinations from the ranked autonomous vehicles according to obtained user's user inclination information.

6. The method according to claim 1, wherein the determining the order-taking probability of drivers of found manned vehicles taking the order comprises:
evaluating the order-taking probability by using an evaluation model obtained by training historical orders.

7. The method according to claim 1, wherein after broadcasting the order to the found manned vehicles, the method further comprises:
if there are drivers taking the order, selecting one manned vehicle from the order-taken manned vehicles and scheduling said one manned vehicle to the user.

8. A computer device, comprising a memory, a processor and a computer program which is stored on the memory and runnable on the processor, wherein the processor, upon executing the program, implements a vehicle scheduling method, wherein the method comprises:
obtaining a travel request sent by a user;
determining a first area according to a starting position carried in the travel request;
looking up to find manned vehicles which are located in the first area and in a free state, and if manned vehicles are found, broadcasting an order to the found manned vehicles;
if no drivers take the order, determining a second area according to the starting position;
looking up to find autonomous vehicles which are located in the second area and in a free state; and if autonomous vehicles are found, selecting one from the found autonomous vehicles and scheduling said one autonomous vehicle to travel to the user,
wherein the determining the first area according to the starting position carried in the travel request comprises:
determining an order-taking probability of drivers of found manned vehicles taking the order in an area of a first predetermined size including the starting position;
comparing the order-taking probability with a preset threshold;
regarding the area of the first predetermined size including the starting position as the first area if the order-taking probability is larger than or equal to the threshold;
regarding an area of a second predetermined size including the starting position as the first area if the order-taking probability is smaller than the preset threshold;
wherein the area of the first predetermined size is smaller than the area of the second predetermined size.

9. The computer device according to claim 8, wherein before obtaining the travel request sent by the user, the method further comprises:
dividing a vehicle operation area into at least two mesh units;
the determining the first area comprises:
determining the mesh unit where the starting position lies;
regarding an area at least including the mesh unit where the starting position lies as the first area.

10. The computer device according to claim 9, wherein the determining the second area according to the starting position comprises:
determining the mesh unit where the starting position lies;
regarding the mesh unit where the starting position lies and a surrounding area of a third predetermined size as the second area.

11. The computer device according to claim 9, wherein after dividing the vehicle operation area into at least two mesh units, the method further comprises:
with respect to each mesh unit, respectively determining a list of Points of Interest POIs which are located in the mesh unit and have parking for vehicles;
the selecting one from the found autonomous vehicles and scheduling said one autonomous vehicle to travel to the user comprises:
determining the mesh unit where the starting position lies;
displaying a POI list corresponding to the mesh unit where the starting position lies to the user;
regarding a POI selected by the user from the POI list as a user's get-on position;
respectively determining time that would be spent by each of the found autonomous vehicles in reaching the get-on position;
ranking the found autonomous vehicles in an ascending order of the spent time;
scheduling the autonomous vehicle ranking the first to travel to the user.

12. The computer device according to claim 11, wherein after ranking the found autonomous vehicles, the method further comprises:
removing autonomous vehicles incompliant with a user's inclinations from the ranked autonomous vehicles according to obtained user's user inclination information.

13. The computer device according to claim 8, wherein the determining the order-taking probability of drivers of found manned vehicles taking the order comprises:
evaluating the order-taking probability by using an evaluation model obtained by training historical orders.

14. The computer device according to claim 8, wherein after broadcasting the order to the found manned vehicles, the method further comprises:
if there are drivers taking the order, selecting one manned vehicle from the order-taken manned vehicles and scheduling said one manned vehicle to the user.

15. A non-transitory computer-readable storage medium on which a computer program is stored, wherein the program, when executed by a processor, implements a vehicle scheduling method, wherein the method comprises:
obtaining a travel request sent by a user;
determining a first area according to a starting position carried in the travel request;
looking up to find manned vehicles which are located in the first area and in a free state, and if manned vehicles are found, broadcasting an order to the found manned vehicles;
if no drivers take the order, determining a second area according to the starting position;
looking up to find autonomous vehicles which are located in the second area and in a free state; and if autonomous vehicles are found, selecting one from the found autonomous vehicles and scheduling said one autonomous vehicle to travel to the user,
wherein the determining the first area according to the starting position carried in the travel request comprises:
determining an order-taking probability of drivers of found manned vehicles taking the order in an area of a first predetermined size including the starting position;
comparing the order-taking probability with a preset threshold;
regarding the area of the first predetermined size including the starting position as the first area if the order-taking probability is larger than or equal to the threshold;
regarding an area of a second predetermined size including the starting position as the first area if the order-taking probability is smaller than the preset threshold;
wherein the area of the first predetermined size is smaller than the area of the second predetermined size.

16. The non-transitory computer-readable storage medium according to claim 15, wherein
before obtaining the travel request sent by the user, the method further comprises:
dividing a vehicle operation area into at least two mesh units;
the determining the first area comprises:
determining the mesh unit where the starting position lies;
regarding an area at least including the mesh unit where the starting position lies as the first area.

17. The non-transitory computer-readable storage medium according to claim 15, wherein
the determining the order-taking probability of drivers of found manned vehicles taking the order comprises:
evaluating the order-taking probability by using an evaluation model obtained by training historical orders.

* * * * *

UNITED STATES PATENT AND TRADEMARK OFFICE
CERTIFICATE OF CORRECTION

PATENT NO. : 11,127,303 B2
APPLICATION NO. : 16/116536
DATED : September 21, 2021
INVENTOR(S) : Tao Liu It is certified that error appears in the above-identified patent and that said Letters Patent is hereby corrected as shown below:

In the Claims

Column 16, Claim 1, Line 58:
"taking probability is smaller than the reset threshold;"
Should read:
--taking probability is smaller than the preset threshold;--.

Signed and Sealed this
First Day of November, 2022

Katherine Kelly Vidal
*Director of the United States Patent and Trademark Office*